(12) United States Patent
Ferris

(10) Patent No.: US 8,717,699 B1
(45) Date of Patent: May 6, 2014

(54) VOLTAGE QUADRUPLER COMPRISING A SECOND CHARGING CAPACITOR CHARGED USING A FIRST CHARGING CAPACITOR

(75) Inventor: Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 171 days.

(21) Appl. No.: 13/347,562

(22) Filed: Jan. 10, 2012

(51) Int. Cl.
*G11B 5/02* (2006.01)

(52) U.S. Cl.
USPC ............... 360/55; 360/46; 360/61; 360/67

(58) Field of Classification Search
None
See application file for complete search history.

(56) References Cited

U.S. PATENT DOCUMENTS

| | | |
|---|---|---|
| 3,821,627 A | 6/1974 | Milovancevic |
| 4,199,806 A | 4/1980 | Patterson, III |
| 5,095,223 A | 3/1992 | Thomas |
| 5,600,551 A | 2/1997 | Luscher, Jr. |
| 5,684,682 A | 11/1997 | Zhong et al. |
| 6,069,516 A | 5/2000 | Vargha |
| 6,163,494 A | 12/2000 | Nork |
| 2005/0052220 A1 | 3/2005 | Burgener et al. |
| 2008/0084720 A1 | 4/2008 | Thiele et al. |
| 2010/0214010 A1 | 8/2010 | Burgener et al. |
| 2013/0027126 A1* | 1/2013 | Jayaraman et al. ........... 327/547 |

* cited by examiner

*Primary Examiner* — Muhammad N Edun

(57) ABSTRACT

A voltage booster is disclosed comprising an input for receiving an input voltage Vin, a first charging capacitor C1, a second charging capacitor C2, and an output capacitor Cout. The output capacitor Cout is charged to four times Vin by connecting C1 in parallel with Vin to charge C1 to Vin, after charging C1 to Vin, connecting C2 in parallel with Vin plus C1 to charge C2 to twice Vin, after charging C2 to twice Vin, connecting C1 in parallel with Vin to recharge C1 to Vin, and after recharging C1, connecting Cout in parallel with Vin plus C1 plus C2 to charge Cout to four times Vin.

22 Claims, 5 Drawing Sheets

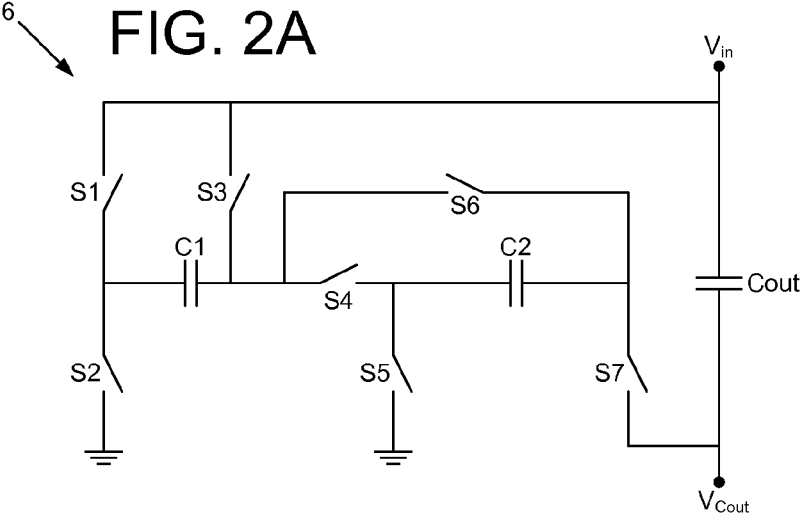

| STATE | S1 | S2 | S3 | S4 | S5 | S6 | S7 | STATE RESULT |
|---|---|---|---|---|---|---|---|---|
| 1 | OFF | ON | ON | OFF | ON | ON | OFF | $V_{C1}=V_{C2}=V_{in}$ |
| 2 | OFF | OFF | OFF | OFF | OFF | OFF | OFF | ANTI-CROSS |
| 3 | ON | OFF | OFF | ON | OFF | OFF | ON | $V_{Cout}=V_{in}+V_{C1}+V_{C2}=3V_{in}$ |
| 4 | OFF | OFF | OFF | OFF | OFF | OFF | OFF | ANTI-CROSS |

FIG. 2C

| STATE | S1 | S2 | S3 | S4 | S5 | S6 | S7 | STATE RESULT |
|---|---|---|---|---|---|---|---|---|
| 1 | OFF | ON | ON | OFF | OFF | OFF | OFF | $V_{C1}=V_{in}$ |
| 2 | OFF | OFF | OFF | OFF | OFF | OFF | OFF | ANTI-CROSS |
| 3 | ON | OFF | OFF | OFF | ON | ON | OFF | $V_{C2}=V_{in}+V_{C1}=2V_{in}$ |
| 4 | OFF | OFF | OFF | OFF | OFF | OFF | OFF | ANTI-CROSS |
| 5 | OFF | ON | ON | OFF | OFF | OFF | OFF | $V_{C1}=V_{in}$ |
| 6 | OFF | OFF | OFF | OFF | OFF | OFF | OFF | ANTI-CROSS |
| 7 | ON | OFF | OFF | ON | OFF | OFF | ON | $V_{Cout}=V_{in}+V_{C1}+V_{C2}=4V_{in}$ |
| 8 | OFF | OFF | OFF | OFF | OFF | OFF | OFF | ANTI-CROSS |

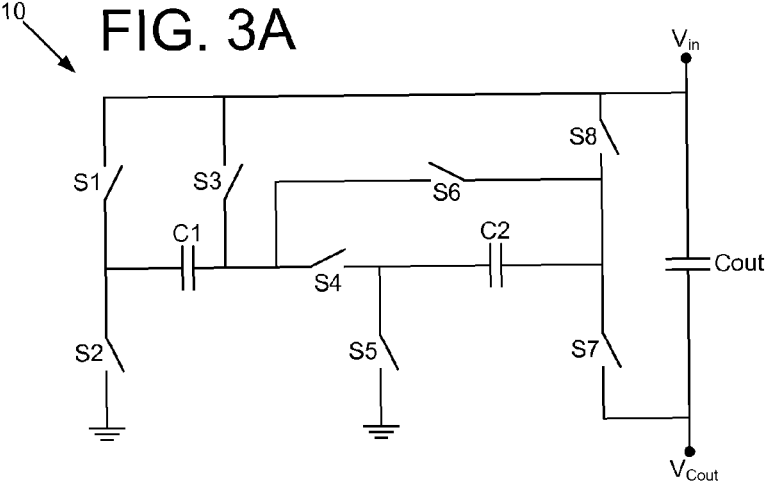

| STATE | S1 | S2 | S3 | S4 | S5 | S6 | S7 | S8 | STATE RESULT |
|---|---|---|---|---|---|---|---|---|---|
| 1 | OFF | ON | ON | OFF | ON | OFF | OFF | ON | $V_{C1}=V_{C2}=V_{in}$ |
| 2 | OFF | OFF | OFF | OFF | OFF | OFF | OFF | OFF | ANTI-CROSS |
| 3 | ON | OFF | OFF | ON | OFF | OFF | ON | OFF | $V_{Cout}=V_{in}+V_{C1}+V_{C2}=3V_{in}$ |
| 4 | OFF | OFF | OFF | OFF | OFF | OFF | OFF | OFF | ANTI-CROSS |

FIG. 3C

| STATE | S1 | S2 | S3 | S4 | S5 | S6 | S7 | S8 | STATE RESULT |
|---|---|---|---|---|---|---|---|---|---|
| 1 | OFF | ON | ON | OFF | OFF | OFF | OFF | OFF | $V_{C1}=V_{in}$ |
| 2 | OFF | OFF | OFF | OFF | OFF | OFF | OFF | OFF | ANTI-CROSS |
| 3 | ON | OFF | OFF | OFF | ON | ON | OFF | OFF | $V_{C2}=V_{in}+V_{C1}=2V_{in}$ |
| 4 | OFF | OFF | OFF | OFF | OFF | OFF | OFF | OFF | ANTI-CROSS |
| 5 | OFF | ON | ON | OFF | OFF | OFF | OFF | OFF | $V_{C1}=V_{in}$ |
| 6 | OFF | OFF | OFF | OFF | OFF | OFF | OFF | OFF | ANTI-CROSS |
| 7 | ON | OFF | OFF | ON | OFF | OFF | ON | OFF | $V_{Cout}=V_{in}+V_{C1}+V_{C2}=4V_{in}$ |
| 8 | OFF | OFF | OFF | OFF | OFF | OFF | OFF | OFF | ANTI-CROSS |

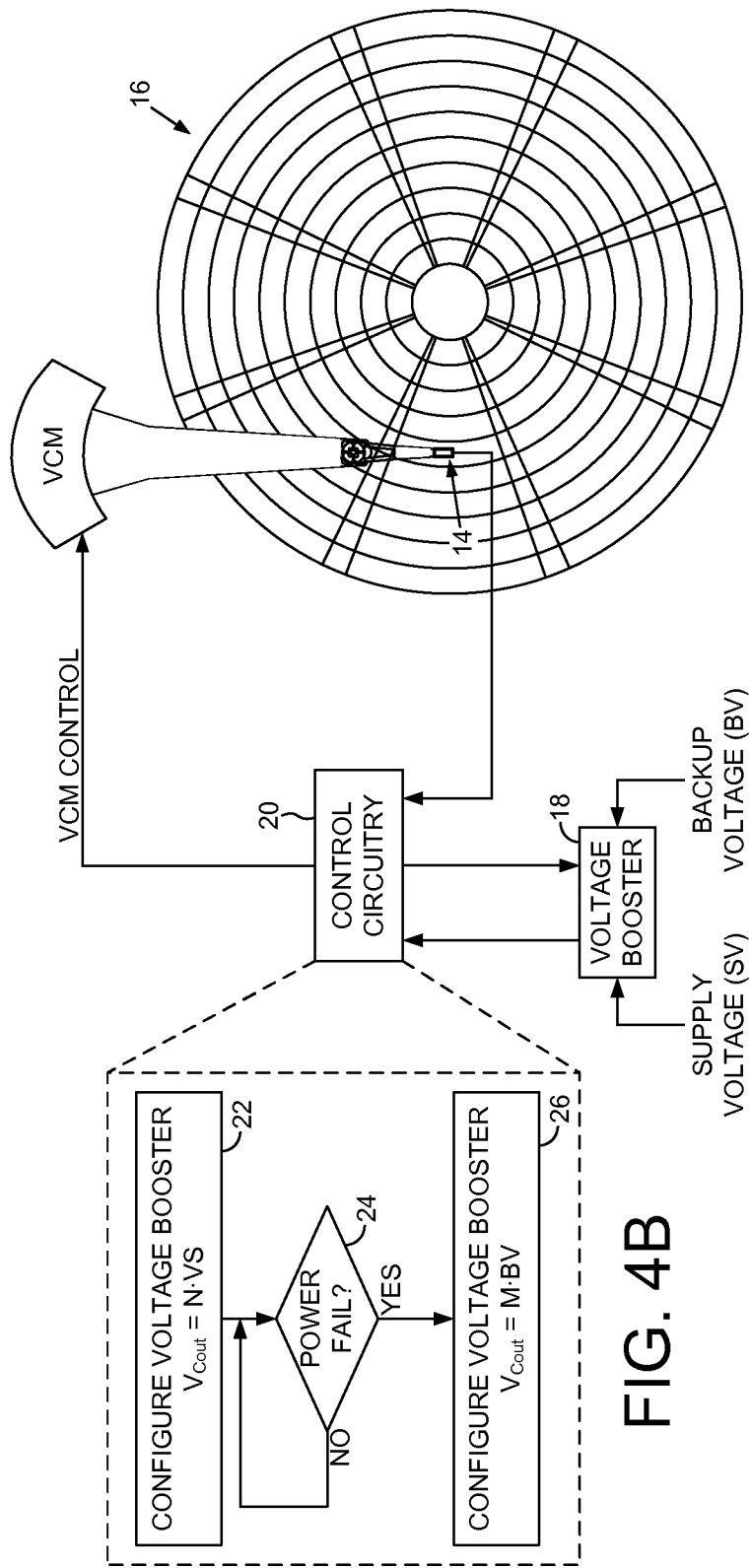

VOLTAGE QUADRUPLER COMPRISING A SECOND CHARGING CAPACITOR CHARGED USING A FIRST CHARGING CAPACITOR

BACKGROUND

Voltage boosters may be employed in any number of electronic devices, such as desktop computers, laptops, tablets, data storage devices, as well as consumer electronics, such as cell phones, televisions, gaming devices, etc. In a typical application, a voltage booster may be used to boost a supply voltage that is dropping due, for example, to a battery discharging. In another example, a disk drive may use a voltage booster to boost a backup supply during a power failure so that the current access operation can be completed before parking the heads and shutting down safely.

FIG. 1A shows a prior art voltage quadrupler 2 comprising three charging capacitors C1, C2 and C3, an output capacitor Cout, and a number of switches. FIG. 1B shows control circuitry 4 for implementing a state machine that controls the switches of the voltage quadrupler 2 according to the following sequence:
1. connect C1, C2 and C3 in parallel with Vin to charge $V_{C1}=V_{in}$, $V_{C2}=V_{in}$, $V_{C3}=V_{in}$; and
2. connect Cout in parallel with $V_{C1}+V_{C2}+V_{C3}+V_{in}$ to charge $V_{Cout}=4Vin$.

The above sequence is repeated at a high frequency, transferring energy from C1, C2 and C3 to Cout, thereby generating an output voltage that is quadruple the input voltage.

BRIEF DESCRIPTION OF THE DRAWINGS

FIG. 2A shows a voltage quadrupler according to an embodiment of the present invention comprising two charging capacitors.

FIG. 2B shows control circuitry according to an embodiment of the present invention implementing a state machine for charging an output capacitor to three times an input voltage.

FIG. 2C shows control circuitry according to an embodiment of the present invention implementing a state machine for charging an output capacitor to four times an input voltage.

FIG. 3A shows another embodiment of a voltage quadrupler according to an embodiment of the present invention comprising two charging capacitors.

FIG. 3B shows control circuitry according to an embodiment of the present invention implementing a state machine for charging an output capacitor to three times an input voltage.

FIG. 3C shows control circuitry according to an embodiment of the present invention implementing a state machine for charging an output capacitor to four times an input voltage.

FIG. 4A shows a disk drive according to an embodiment of the present invention comprising a head actuated over a disk, and a voltage booster.

FIG. 4B is a flow diagram according to an embodiment of the present invention wherein the voltage booster boosts a supply voltage by N during normal operation and boosts a backup voltage by M during a power failure.

DETAILED DESCRIPTION OF EMBODIMENTS OF THE INVENTION

Figures 1A, 1B:
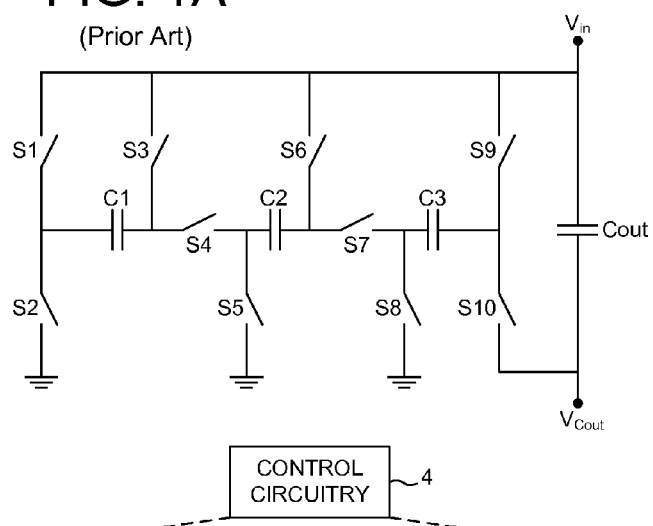
FIG. 1A shows a prior art voltage quadrupler comprising three charging capacitors.
FIG. 1B shows prior art control circuitry implementing a state machine for charging an output capacitor to four times an input voltage.

FIG. 2A shows a voltage booster 6 according to an embodiment of the present invention comprising an input for receiving an input voltage Vin, a first charging capacitor C1, a second charging capacitor C2, and an output capacitor Cout. The output capacitor Cout is charged to four times Vin by connecting C1 in parallel with Vin to charge C1 to Vin, after charging C1 to Vin, connecting C2 in parallel with Vin plus C1 to charge C2 to twice Vin, after charging C2 to twice Vin, connecting C1 in parallel with Vin to recharge C1 to Vin, and after recharging C1, connecting Cout in parallel with Vin plus C1 plus C2 to charge Cout to four times Vin.

In the embodiment of FIG. 2A, the voltage booster 6 comprises a plurality of switches S1-S7 configured by control circuitry 8 into an on/off state defined by a state machine. FIG. 2C shows a state machine implemented by the control circuitry 8 in order to charge the output capacitor Cout to four times Vin as described above. In this embodiment, all of the switches are turned off after each charging state to implement an anti-cross conduction operation (ANTI-CROSS). The states of the state machine in FIG. 2C are repeated at a frequency related to the size of the capacitors so as to maintain the output voltage $V_{Cout}$ at substantially four times Vin. In one embodiment, the size of the charging capacitors C1 and C2 and the output capacitor Cout may be selected based on the capacity of the input current and/or the load current supplied by the output voltage $V_{Cout}$.

In one embodiment, the voltage booster 6 of FIG. 2A is configurable to charge the output capacitor Cout to three times Vin or to four times Vin. For example, in an embodiment described below, a disk drive may employ the voltage booster in order to boost a supply voltage by three times during normal operation, and operable to boost a backup voltage by four times during a power failure. Referring again to FIG. 2A, the output capacitor Cout may be charged to three times Vin using the state machine shown in FIG. 2B by connecting C1 in parallel with Vin to charge C1 to Vin, connecting C2 in parallel with Vin to charge C2 to Vin, and after charging C1 and C2 to Vin, connecting Cout in parallel with Vin plus C1 plus C2 to charge Cout to three times Vin.

In the embodiment of FIG. 2A, Vin is a voltage with respect to a reference node (ground in this example). When boosting the output voltage by three times Vin, during the first state of the state machine of FIG. 2B a first switch S3 is operable to connect C1 to Vin and a second switch S2 is operable to connect C1 to the reference node. The first switch S3 and a third switch S6 are operable to connect C2 to Vin and a fourth switch S5 is operable to connect C2 to the reference node. Connecting C2 to Vin through two switches (S3 and S6) reduces the efficiency of the voltage booster 6 compared to an embodiment that employs a single switch.

FIG. 3A shows a voltage booster 10 according to an embodiment of the present invention which includes an additional switch S8 compared to the embodiment of FIG. 2A. FIG. 3B shows control circuitry 12 for implementing a state machine for boosting the input voltage by three times Vin, and FIG. 3C shows a state machine for boosting the input voltage by four times Vin. When boosting the input voltage by three times Vin, a single switch S8 connects C2 to Vin, and a single switch S5 connects C2 to the reference node (ground). A single switch S3 connects C1 to Vin, and a single switch S2 connects C1 to the reference node. This embodiment is more efficient than the embodiment of FIG. 2A since charging capacitor C2 is connected through a single switch S8 to Vin during the first state of the state machine of FIG. 3B.

FIG. 4A shows a disk drive according to an embodiment of the present invention comprising a head 14 actuated over a disk 16, and a voltage booster 18 configurable into a first mode to boost a supply voltage (SV) by N and configurable into a second mode to boost a backup voltage (BV) by M greater than N. The disk drive further comprises control circuitry 20 operable to execute the flow diagram of FIG. 4B, wherein the voltage booster 18 is configured into the first mode during normal operation (step 22), and the voltage booster 18 is configured into the second mode (step 26) during a power failure (step 24). In one embodiment, the voltage booster 18 boosts the supply voltage (SV) by three times during normal operation, and boosts the backup voltage (BV) by four times during the power failure. The control circuitry 20 may use the boosted backup voltage to safely perform a shutdown operation, such as finishing the current write operation and parking the heads on a ramp.

The backup voltage (BV) may be generated in any suitable manner. In one embodiment, a backup capacitor may be charged by the supply voltage (SV) during normal operation, wherein the backup voltage (BV) may be generated using the backup capacitor during the power failure. In one embodiment, a back electromotive force (BEMF) voltage generated by a spindle motor that rotates the disk 16 may be used to generate the backup voltage (BV). In one embodiment, the backup capacitor may be charged using the BEMF voltage generated by the spindle motor when the backup voltage (BV) falls below the BEMF voltage.

Figure 5:
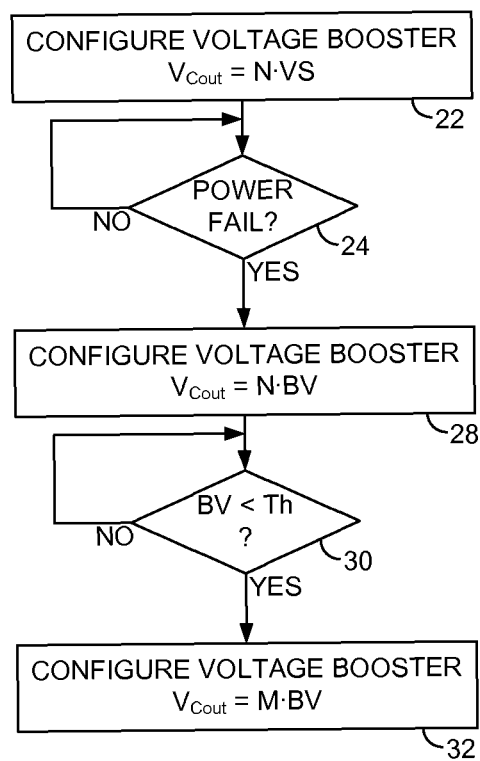
FIG. 5 is a flow diagram according to an embodiment of the present invention wherein the voltage booster boosts the backup voltage by M after the backup voltage falls below a threshold during the power failure.

In another embodiment illustrated in the flow diagram of FIG. 5, the voltage booster 18 may be configured to boost the backup voltage (BV) by N during a first part of the power fail operation (step 28). When the backup voltage (BV) decays below a threshold (step 30) due to a backup capacitor discharging and/or a BEMF voltage of the spindle motor falling, the voltage booster 18 may be configured to boost the backup voltage (BV) by M during the remainder of the power fail operation (step 32).

The control circuitry of the voltage booster in FIGS. 2A and 3A and the control circuitry of the disk drive in FIG. 4A may comprise any suitable circuitry, such as an application specific integrated circuit (ASIC) comprising suitable logic circuitry for implementing the state machines disclosed herein. In another embodiment, the control circuitry of the voltage booster and/or the control circuitry of the disk drive may comprise a microprocessor executing code segments of a control program for implementing the state machines disclosed herein, wherein the control program may be stored on any suitable computer readable storage medium, such as a disk or semiconductor memory.

What is claimed is:

1. A voltage booster comprising:
    an input for receiving an input voltage Vin;
    a first charging capacitor C1;
    a second charging capacitor C2;
    an output capacitor Cout; and
    control circuitry operable to charge the output capacitor Cout to four times Vin by:
        connecting C1 in parallel with Vin to charge C1 to Vin;
        after charging C1 to Vin, connecting C2 in parallel with Vin plus C1 to charge C2 to twice Vin;
        after charging C2 to twice Vin, connecting C1 in parallel with Vin to recharge C1 to Vin; and
        after recharging C1, connecting Cout in parallel with Vin plus C1 plus C2 to charge Cout to four times Vin.

2. The voltage booster as recited in claim 1, wherein the control circuitry is further operable to charge the output capacitor Cout to three times Vin by:
    connecting C1 in parallel with Vin to charge C1 to Vin;
    connecting C2 in parallel with Vin to charge C2 to Vin; and
    after charging C1 and C2 to Vin, connecting Cout in parallel with Vin plus C1 plus C2 to charge Cout to three times Vin.

3. The voltage booster as recited in claim 2, wherein Vin is a voltage with respect to a reference node, the voltage booster further comprising:
    a first switch operable to connect C1 to Vin and a second switch operable to connect C1 to the reference node; and
    the second switch and a third switch operable to connect C2 to Vin and a fourth switch operable to connect C2 to the reference node.

4. The voltage booster as recited in claim 2, wherein Vin is a voltage with respect to a reference node, the voltage booster further comprising:
    a single first switch operable to connect C1 to Vin and a single second switch operable to connect C1 to the reference node; and
    a single third switch operable to connect C2 to Vin and a single fourth switch operable to connect C2 to the reference node.

5. A disk drive comprising:
    a disk;
    a head actuated over the disk; and
    a voltage booster configurable into a first mode to boost a supply voltage (SV) by N and configurable into a second mode to boost a backup voltage (BV) by M greater than N; and
    control circuitry operable to:
        configure the voltage booster into the first mode during normal operation; and
        configure the voltage booster into the second mode during a power failure.

6. The disk drive as recited in claim 5, wherein the control circuitry is operable to configure the voltage booster into the second mode after the backup voltage decays below a threshold during the power failure.

7. The disk drive as recited in claim 5, wherein N equals three and M equals four.

8. The disk drive as recited in claim 7, wherein the voltage booster comprises a first charging capacitor C1, a second charging capacitor C2, and an output capacitor Cout, wherein the control circuitry is operable to charge the output capacitor Cout to four times BV by:
    connecting C1 in parallel with BV to charge C1 to BV;
    connecting C2 in parallel with BV plus C1 to charge C2 to twice BV;
    after charging C2 to twice BV, connecting C1 in parallel with BV to recharge C1 to BV; and
    after recharging C1, connecting Cout in parallel with BV plus C1 plus C2 to charge Cout to four times BV.

9. The disk drive as recited in claim 8, wherein the control circuitry is further operable to charge the output capacitor Cout to three times SV by:
    connecting C1 in parallel with SV to charge C1 to VS;
    connecting C2 in parallel with SV to charge C2 to VS; and
    after charging C1 and C2 to SV, connecting Cout in parallel with SV plus C1 plus C2 to charge Cout to three times SV.

10. The disk drive as recited in claim 9, wherein VS is a voltage with respect to a reference node, the voltage booster further comprising:
- a first switch operable to connect C1 to VS and a second switch operable to connect C1 to the reference node; and
- the second switch and a third switch operable to connect C2 to VS and a fourth switch operable to connect C2 to the reference node.

11. The disk drive as recited in claim 9, wherein VS is a voltage with respect to a reference node, the voltage booster further comprising:
- a single first switch operable to connect C1 to VS and a single second switch operable to connect C1 to the reference node; and
- a single third switch operable to connect C2 to VS and a single fourth switch operable to connect C2 to the reference node.

12. A method of operating a voltage booster, the voltage booster comprising an input for receiving an input voltage Vin, a first charging capacitor C1, a second charging capacitor C2, and an output capacitor Cout, the method comprising charging the output capacitor Cout to four times Vin by:
- connecting C1 in parallel with Vin to charge C1 to Vin;
- after charging C1 to Vin, connecting C2 in parallel with Vin plus C1 to charge C2 to twice Vin;
- after charging C2 to twice Vin, connecting C1 in parallel with Vin to recharge C1 to Vin; and
- after recharging C1, connecting Cout in parallel with Vin plus C1 plus C2 to charge Cout to four times Vin.

13. The method as recited in claim 12, further comprising charging the output capacitor Cout to three times Vin by:
- connecting C1 in parallel with Vin to charge C1 to Vin;
- connecting C2 in parallel with Vin to charge C2 to Vin; and
- after charging C1 and C2 to Vin, connecting Cout in parallel with Vin plus C1 plus C2 to charge Cout to three times Vin.

14. The method as recited in claim 13, wherein Vin is a voltage with respect to a reference node, the method further comprising:
- connecting C1 to Vin through a first switch and connecting C1 to the reference node through a second switch; and
- connecting C2 to Vin through the second switch and a third switch and connecting C2 to the reference node through a fourth switch.

15. The method as recited in claim 13, wherein Vin is a voltage with respect to a reference node, the method further comprising:
- connecting C1 to Vin through a single first switch and connecting C1 to the reference node through a single second switch; and
- connecting C2 to Vin through a single third switch and connecting C2 to the reference node through a single fourth switch.

16. A method of operating a disk drive comprising, the disk drive comprising a disk, a head actuated over the disk, and a voltage booster configurable into a first mode to boost a supply voltage (SV) by N and configurable into a second mode to boost a backup voltage (BV) by M greater than N, the method comprising:
- configuring the voltage booster into the first mode during normal operation; and
- configuring the voltage booster into the second mode during a power failure.

17. The method as recited in claim 16, further comprising configuring the voltage booster into the second mode after the backup voltage decays below a threshold during the power failure.

18. The method as recited in claim 16, wherein N equals three and M equals four.

19. The method as recited in claim 18, wherein the voltage booster comprises a first charging capacitor C1, a second charging capacitor C2, and an output capacitor Cout, the method further comprising charging the output capacitor Cout to four times BV by:
- connecting C1 in parallel with BV to charge C1 to BV;
- connecting C2 in parallel with BV plus C1 to charge C2 to twice BV;
- after charging C2 to twice BV, connecting C1 in parallel with BV to recharge C1 to BV; and
- after recharging C1, connecting Cout in parallel with BV plus C1 plus C2 to charge Cout to four times BV.

20. The method as recited in claim 19, further comprising charging the output capacitor Cout to three times SV by:
- connecting C1 in parallel with SV to charge C1 to VS;
- connecting C2 in parallel with SV to charge C2 to VS; and
- after charging C1 and C2 to SV, connecting Cout in parallel with SV plus C1 plus C2 to charge Cout to three times SV.

21. The method as recited in claim 20, wherein VS is a voltage with respect to a reference node, the method further comprising:
- connecting C1 to Vin through a first switch and connecting C1 to the reference node through a second switch; and
- connecting C2 to Vin through the second switch and a third switch and connecting C2 to the reference node through a fourth switch.

22. The method as recited in claim 20, wherein VS is a voltage with respect to a reference node, the method further comprising:
- connecting C1 to Vin through a single first switch and connecting C1 to the reference node through a single second switch; and
- connecting C2 to Vin through a single third switch and connecting C2 to the reference node through a single fourth switch.

* * * * *